United States Patent [19]

Reymann et al.

[11] Patent Number: 4,943,228

[45] Date of Patent: Jul. 24, 1990

[54] BLOW MOLDING MACHINE

[75] Inventors: Wolfgang Reymann; Heiko-Ulrich Gropp, both of Hamburg; Klaus Vogel, Barsbüttel; Hartwig Müller, Lüdtiensee, all of Fed. Rep. of Germany

[73] Assignee: Krupp Corpoplast Maschinenbau GmbH, Hamburg

[21] Appl. No.: 346,524

[22] Filed: May 2, 1989

[30] Foreign Application Priority Data

May 4, 1988 [DE] Fed. Rep. of Germany ....... 3815194

[51] Int. Cl.⁵ ...................... B29C 49/36; B29C 49/64
[52] U.S. Cl. ..................................... 425/526; 425/540
[58] Field of Search ............... 425/540, 535, 529, 530, 425/526, 532; 264/532, 543

[56] References Cited

U.S. PATENT DOCUMENTS

| 2,901,769 | 9/1959 | Sherman et al. | 425/532 X |
| 3,954,370 | 5/1976 | Pollock et al. | 425/535 |
| 4,036,925 | 7/1977 | Kauffman et al. | 264/532 |
| 4,285,657 | 8/1981 | Ryder | 425/529 X |
| 4,747,769 | 5/1988 | Nakamura et al. | 425/540 X |
| 4,801,260 | 1/1989 | Oles et al. | 425/540 X |

FOREIGN PATENT DOCUMENTS

| 2304181 | 8/1973 | Fed. Rep. of Germany . |
| 1704119 | 1/1974 | Fed. Rep. of Germany . |
| 2454066 | 6/1975 | Fed. Rep. of Germany . |
| 2742693 | 8/1983 | Fed. Rep. of Germany . |

Primary Examiner—Richard L. Chiesa
Attorney, Agent, or Firm—Harness, Dickey & Pierce

[57] ABSTRACT

The blowing wheel and preferably the heating wheel as well as a large blow molding machine are rotatably supported in a centerfree peripheral bearing means. The heating and blow wheels are constructed as wheel rings to provide a profile free of distortion, wobbling motions or, respectively, peripheral vertical deviations of the wheels are thus prevented and the delivery of parisons of thermoplastic material for processing on the wheels takes place with high accuracy.

13 Claims, 2 Drawing Sheets

BLOW MOLDING MACHINE

FIELD OF THE INVENTION

The present invention relates to a blow molding machine comprising a rotatably driven wheel, bearing means for rotatably supporting said wheel around a vertical axis, a plurality of blow molding stations arranged at the periphery of said wheel in a distance from each other and a plurality of blow mandrels each associated to a blow molding station for carrying a parison made of thermoplastic material into one of said blow mold stations for blowing a hollow article.

BACKGROUND OF THE INVENTION

Blow molding machines for blowing hot parisons made of thermoplastic material to hollow article in blow mold stations located at the periphery of a blowing wheel are known in a wide variety such as for example German reference Nos. 17 04 119, 27 42 693, 23 04 181, 24 54 066 and U.S. Pat. No. 4,036,925. According to this prior art the blowing wheel carrying the blow mold stations as well as the heating wheel for heating the parisons are defined by star wheels having an outer wheel ring which is connected through a plurality of radial arms to a central hub which is rotatably supported around a centercolumn. Details of the bearing means are shown in German No. 24 54 066 for example. The reference shows an upper radial bearing means located in a distance from a lower axial bearing means. The blowing wheel or, respectively heating wheel, is rotatably driven by a tooth gear which is secured to the wheel hub and the tooth gear may be driven from a horizontal shaft through a bevel gear transmission.

In the blow molding art the parisons having a closed bottom are placed on a blow mandrel each, then the blow mandrels are delivered one after the other to the heating wheel, where the parisons pass along stationary heating means. Subsequently, the hot parisons are taken off the heating wheel, may be delivered to an equalizing wheel for equalizing the temperature distribution while they pass around. Finally, the parisons on the blow mandrels are delivered through a further delivery wheel to the blowing wheel and placed in the blow mold stations. Upon closing the blp molding machines, the number of blow mold stations to be mounted on the blowing wheel increased considerably. This results in larger diameters of the blowing wheel and makes improved bearing means necessary to avoid that the blowing wheel exerts wobbling motions around its rotatary axis. This results in problems when the blow mandrels carrying the parisons must be delivered in a very accurate position of height to properly insert the parisons between the blow mold portions. Even a very small axial deviation of the wheel rim from a predetermined height while turning around may lead to difficulties in proper delivering the parisons.

SUMMARY OF THE INVENTION

It is an object of the present invention to provide an improved bearing means for the blowing wheel of a blow mold machine. In particular it is an object to provide a wheel which overcomes the problems referred to above.

It is a further object to provide a wheel structure eliminating wobbling motions resulting in axial deviations of the wheel rimming while turning around, so that the wheel is centered in a predetermined height for easy and proper delivery of the parisons. Further, vibrations of the wheel and in the drive means for the wheel are eliminated.

The improvements achieved by the present invention are obtained by a wheel which is defined by a center-free wheel ring which is rotatably supported in a peripheral bearing.

As to additional embodiments and advantages of the present invention it is referred to the claims and the specification.

Peripheral bearings are known per se and—to the knowledge of applicants—are used for turntables of cranes, dredgers, revolving ladders for which it is typical that the centers of gravity of the machine parts to be supported are located outside of the bearing.

According to the invention, however, the peripheral bearing is located immediately adjacent the outer periphery of the wheel ring on which the blow mold stations are mounted so that the bearing means is provided at the very location where the smallest tolerances are required. Any axial deviation is thus prevented and the parisons may be accurately placed in the blow mold for which delivery procedure a particularly high accuracy is required when the preshaped mouth portion (finish) of the parison must be placed in a corresponding piece of the blow mold. Further, the bearing means according to the invention results in a novel and stable design of the blowing wheel and the profile of the wheel ring. The bearing means in combination with the cross-sectional design of the wheel rim results in a blow mold structure free of vibrations.

A further improvement of the present invention is the free access to the inner area of the heating wheel so that the mounting of the supply means for pressurized air and cooling water to the blow mold stations from the center of the blowing wheel is substantially facilitated. Further the axial dimensions of the blowing wheel are smaller since the center column and the center bearings having a considerable axial distance from each other are eliminated. The driving is not imparted any more through a tooth gear mounted on the hub of a star wheel. Rather the peripheral bearing is provided with a gear ring. This transmission substantially decreases the peripheral play of the drive means.

A further advantage of the bearing and blow wheel structure according to the invention is obtained when axial forces are introduced to the periphery of the blow wheel in particular forces acting on the stretching rod to mechanically stretching the parison which forces are supported by the peripheral-bearing means so that the running of the stretching rods of stationary cam means do not result in vertical deviations of the blow wheel periphery. Rather the axial forces acting on the wheel rim are supported by the bearing means adjacent the stretching rods.

DETAILED DESCRIPTION OF THE INVENTION

Figure 1:
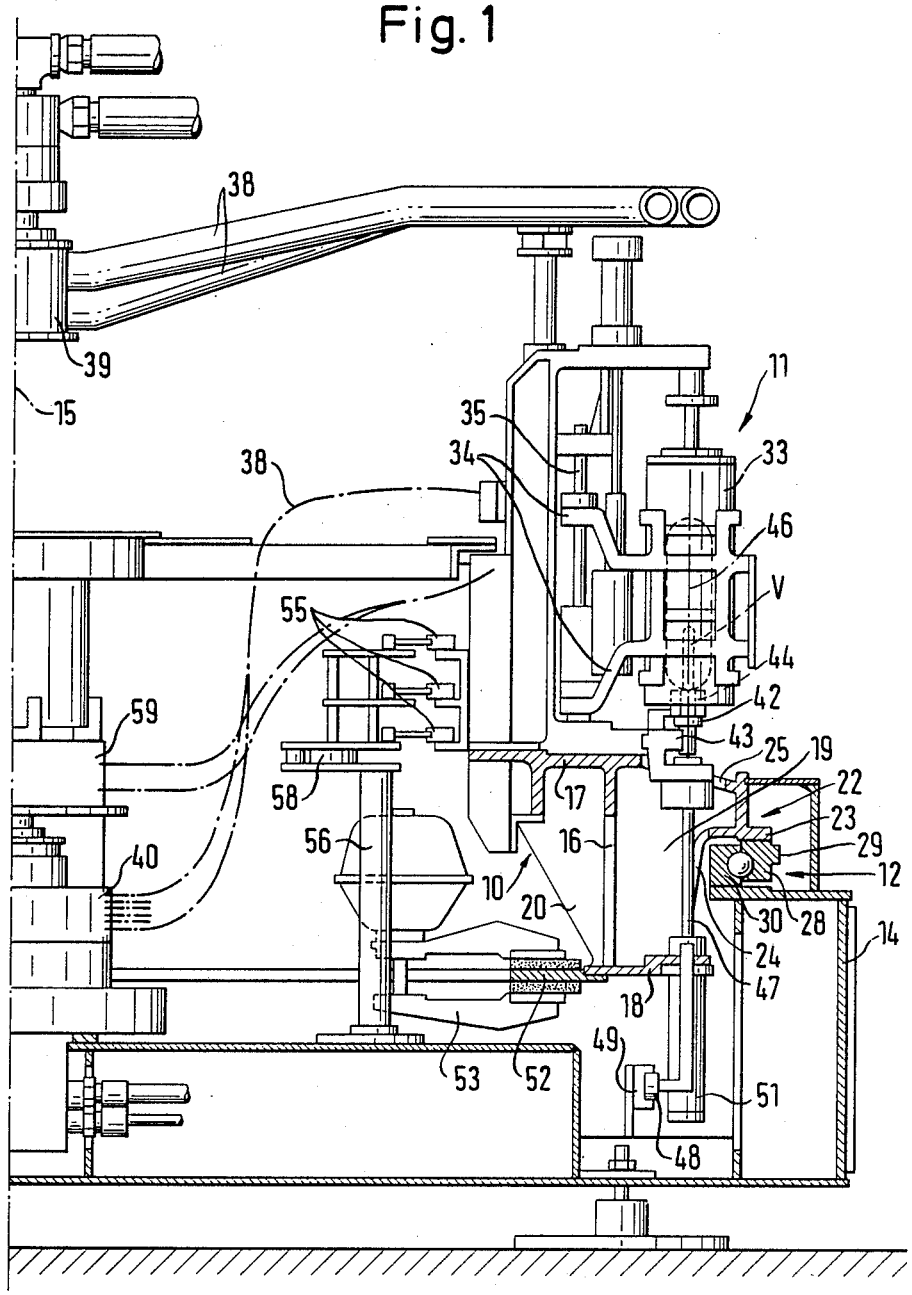
FIG. 1 is a transverse sectional view of a half of a blowing wheel with blow mold stations mounted thereon.

FIG. 1 shows a wheel ring 10 of a blowing wheel carrying equidistantly along the periphery a plurality of blow mold stations 11. The wheel ring 10 is supported on a stationary base 14 by a peripheral bearing means 12 to be rotated around a center axis 15.

The profile of the ring 10 is substantially I-shaped including a central vertical beam 16 and relatively broad flanges 17, 18 extending from the beam 16 at either end. The structure is reinforced by outer and inner radial ribs 19, 20. The outer periphery of the I-shaped profile of the ring 10 includes a projecting bracket 22 including a horizontal flange 23 which is placed on top of the bearing means 12. The flange 23 is connected to the lower flange 18 or, respectively, the upper flange 17 of the ring through mounting portions 24, 25.

An outer ring 28 of the bearing means 12 is secured to the flange 23 of the claw-typed bracket 22 and carries an outer gear 29 for camming with a drive means. An inner bearing ring 30 is secured to the stationary base 14. A number of ball members is provided between the outer and inner ring 29, 30 running in ball tracks to radially and axially support the bearing forces.

The blow mold stations 11 are mounted on the upper flange 17. FIG. 1 schematically shows a blow mold section 33 which is pivoted around a pivot axis 35 by means of pivot arms 34. Tubes and hoses 38 in combination with a rotating port means 39—known per se—are connected to the blow mold section 33 shown as well as the corresponding blow mold section not shown to deliver and remove cooling water. The pressure fluid for cylinders to actuate the blow mold sections is controlled by a rotating valve means 40 known per se and supplied through hoses 38.

FIG. 1 further shows a parison V which is carried on a blow mandrel 42, which is inserted in a blow station 11. The blow mandrel 42 is carried on a holder 43. The lower bottom of the blow mold station is closed by a member 44 enclosing the mouth portion of the parison which member is enclosed by the blow mold sections when the sections are closed. In view of this the delivery of the mandrel 42 on the holder 43 to the wheel rim must be performed with high accuracy. This accuracy is provided by supporting the wheel ring 10 by means of the peripheral bearing 12 which is located radially immediately adjacent the length axis 46 of the parisons V including the mandrel 42 and the stretching rod 47. The length axis 46 runs substantially central between the bearing 12 and the I-profile of the ring 10. The bearing 12 further supports the forces which are mechanically exerted from the base on the stretching rods 47. According to FIG. 1 the stretching rod 47 is displaced by a follower 48 running on a stationary cam 49. Thus the parison is mechanically stretched by the cam follower 48 cooperating with the cam curve 49.

The lower flange 18 of the I-profile extends radially outwardly to mount the stretching cylinder 51. Further the flange 18 includes a radially inward extension 52 defining a brake ring cooperating with a disk brake 53.

A number of valves 55 is mounted between the blow mold stations 11 which valves control the supply of blowing air. The valves 55 are actuated when the continuously driven blow wheel is in predetermined positions. For this a ring 58 is mounted radially within the ring 10 on columns 56 which ring 58 carries actuating means not shown which activate the valves in passing by. The pressure fluid is supplied through a central annular valve means 59.

Figure 2:
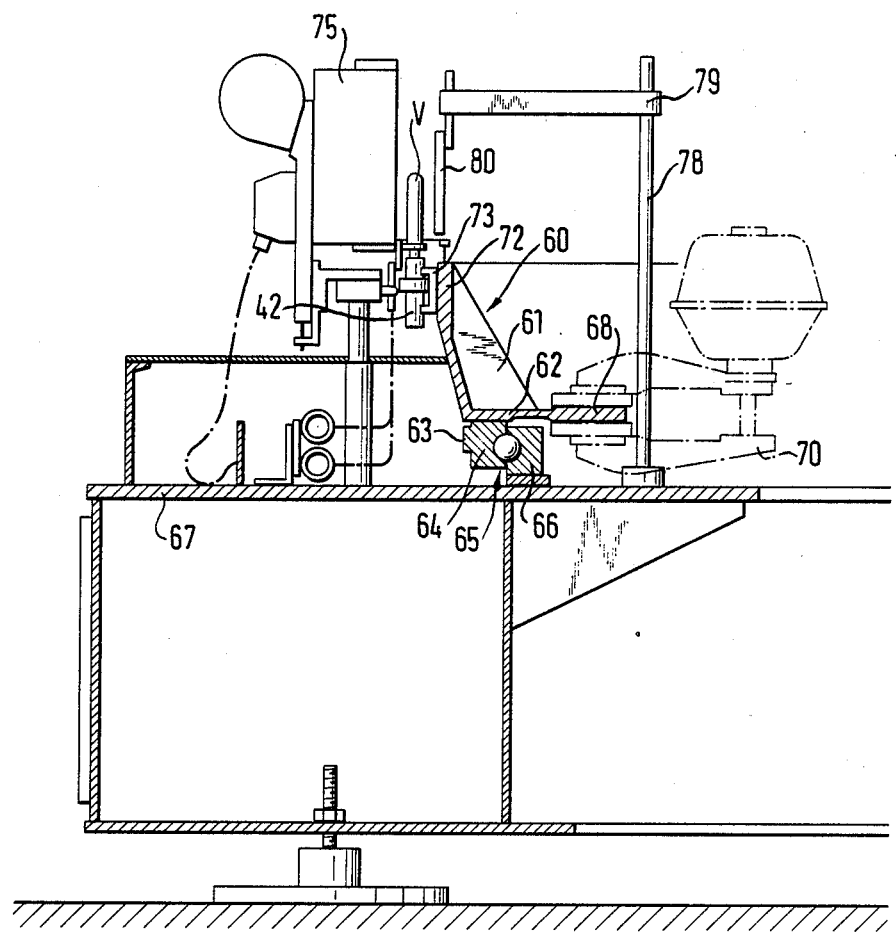
FIG. 2 is a sectional view of a half of a heating wheel.

FIG. 2 shows a wheel ring 60 for a heating wheel. The profile of the wheel ring 60 is L-shaped including a lower flange 62, an upright flange 72 and stiffening ribs 61 therebetween. The outer bearing ring 64 of the peripheral bearing 65 which bearing ring carries gear teeth 63 is secured to the lower flange 62. The inner bearing ring 66 is mounted on the base 67. The lower flange 62 of the L-profile includes a radially inward extension 68 defining a brake ring for a disk brake 70. Holders 73 for the blow mandrels 42 are mounted on the vertical flange 72 of the ring 60 which mandrels carry parisons V for passing along heating means 75. Stationary columns 78 are provided within the brake ring 68 which columns support arms for mounting the reflectors 80 of the heating means. It should be understood that in this embodiment alike the bearing means 65 is located radially adjacent the holders 73 and below the L-shaped profile to avoid any vertical deviations of the wheel rim in turning the wheel and to obtain a high strength of the wheel.

We claim:

1. A blow molding machine comprising:
   a rotatably driven blowing wheel having a vertical axis, a peripheral wheel ring having an outer periphery positioned a radial distance from said axis, and an interior elevated clearance radially positioned between said axis and said peripheral wheel ring,
   a plurality of blow molding stations mounted on said peripheral wheel ring, each station of said plurality spaced a distance apart from each other and each station having a blow mandrel for carrying a parison made of thermo plastic material into a blow mold of said station for blowing a hollow article,
   a peripheral bearing means stationarily positioned at a point immediately adjacent said outer periphery substantially adjacent a rotational path of said plurality of blow molding stations on said peripheral wheel ring, said peripheral bearing means for maintaining said rotational path and plurality of blow mold stations stable.

2. The blow molding machine of claim 1, wherein the peripheral wheel ring defines an I-profile including a radially outwardly projecting bracket underneath of which the peripheral bearing means is located.

3. The blow molding machine of claim 1, wherein the peripheral bearing means is provided substantially equidistantly from an upper and lower flange of the peripheral wheel ring.

4. The blow molding machine of claim 1, wherein the peripheral bearing means carries a drive means having outer teeth.

5. The blow molding machine of claim 2, wherein the plurality of blow mold stations is mounted on an upper flange of the I-profile.

6. The blow molding machine of claim 2, wherein a lower flange of the I-profile includes a radially inwardly directed extension to define a brake ring for a disk brake.

7. The blow molding machine of claim 2, wherein the length axis of the blow mold, the blow mandrel and a stretching rod of each blow mold station and the I-profile and the peripheral bearing means are in vertical alignment.

8. The blow molding machine of claim 2, wherein a lower flange of the I-profile includes a radially outwardly directed extension for mounting a cylinder to actuate a stretching rod.

9. The blow molding machine of claim 8, wherein the stretching rod is actuated by a cam mounted on a base radially adjacent said peripheral bearing means.

10. The blow molding machine of claim 1, wherein a stationary means for actuating a plurality of valves associated with the plurality of blow mold stations is radially provided inward of the peripheral wheel ring.

11. The blow molding machine of claim 1, further comprising:
   a plurality of stationary bearing means,
   a rotatably driven heating wheel having a vertical heating wheel axis, a peripheral heating wheel ring having an outer periphery positioned a radial distance from said axis, and an interior elevated heating wheel clearance radially positioned between said heating wheel axis and said peripheral heating wheel ring,
   a plurality of heating stations mounted on said peripheral heating wheel ring, each heating station of said plurality having a blow mandrel carrying a parison to be heated to blow temperature by said stationary heating means, and
   a peripheral heating wheel bearing means positioned immediately adjacent said outer periphery of said peripheral heating wheel ring for rotatably supporting said heating wheel.

12. The blow molding machine of claim 11, wherein the peripheral heating wheel ring is defined by an L-shaped profile and wherein the peripheral heating wheel bearing means is mounted underneath a radially inwardly extending flange of said L-shaped profile.

13. The blow molding machine of claim 11, wherein an outer bearing ring of the peripheral heating wheel bearing means is provided with tooth means which are driven from a ring gear on the blowing wheel through additional tooth means provided on intermediate wheels drivingly connecting said heating wheel and blowing wheel.

* * * * *

UNITED STATES PATENT AND TRADEMARK OFFICE
CERTIFICATE OF CORRECTION

PATENT NO. : 4,943,228

DATED : July 24, 1990

INVENTOR(S) : Reymann, et al

It is certified that error appears in the above-identified patent and that said Letters Patent is hereby corrected as shown below:

Column 5, line 8, Claim 11, "bearing" should be --heating--

Signed and Sealed this

Second Day of February, 1993

Attest:

STEPHEN G. KUNIN

*Attesting Officer*     *Acting Commissioner of Patents and Trademarks*